Sept. 22, 1953  ÅKE EUGEN MURVALL  2,652,991
FISHING REEL
Filed Oct. 13, 1952  2 Sheets-Sheet 1

INVENTOR
Åke Eugen Murvall,
BY Pierce, Scheffler & Parker
his ATTORNEYS

Sept. 22, 1953  AKE EUGEN MURVALL  2,652,991
FISHING REEL
Filed Oct. 13, 1952  2 Sheets-Sheet 2
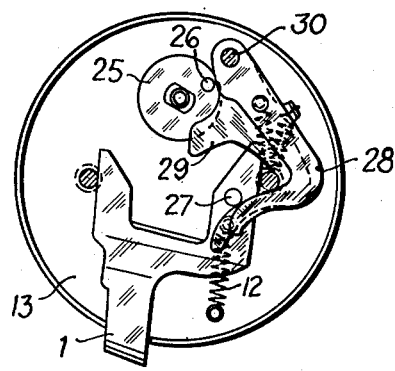
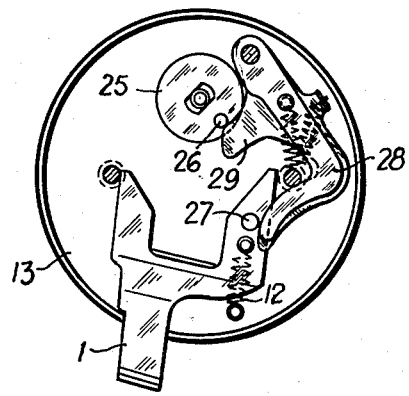
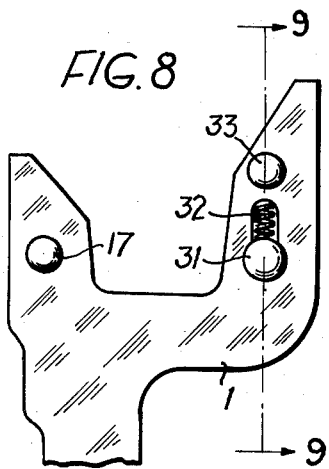
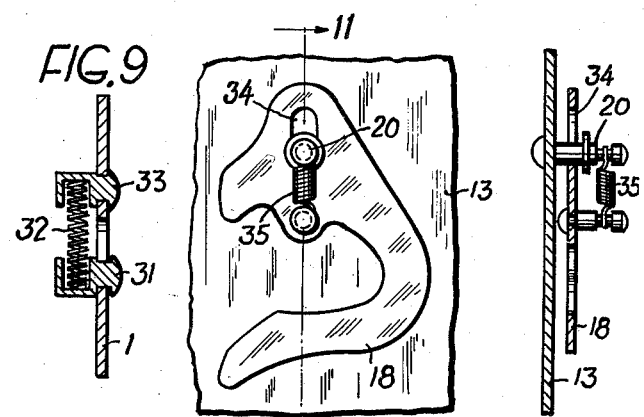
INVENTOR
Ake Eugen Murvall,
BY Pierce, Scheffler & Parker
his ATTORNEYS Patented Sept. 22, 1953

2,652,991

UNITED STATES PATENT OFFICE 2,652,991

FISHING REEL

Åke Eugen Murvall, Svangsta, Sweden, assignor to Aktiebolaget Urfabriken, Svangsta, Sweden, a corporation of Sweden Application October 13, 1952, Serial No. 314,465
In Sweden October 15, 1951

7 Claims. (Cl. 242—84.7)

1

The present invention relates to fishing reels and is particularly concerned with a clutch mechanism for disconnecting the spool from the driving mechanism, comprising an automatic re-engaging device for said clutch.

The object and purpose of the present invention is to improve reels which are provided with a free-spool mechanism, i. e. reels in which the spool can be disconnected from the driving mechanism and the handle so that the spool can turn freely in paying out the line. This type of reels is well-known but heretofore used types of such reels have a disadvantage in that the manually operated lever for disconnecting the spool cannot be brought into the clutch releasing position independently of the position of the automatic re-engaging device, whereby disconnecting the spool cannot always take place.

It is a purpose of the invention to eliminate this drawback so that the spool always may be disengaged from the driving mechanism independently of the position of said re-engaging device. According to the present invention this is accomplished by two swingable locking arms each adapted independently of the other in one position to retain the disconnecting lever in the clutch releasing position and in another position to release said lever, and means connected with the driving mechanism for cooperation with said locking arms one at a time and adapted when said lever is in the clutch releasing position to release said locking arms for enabling said lever to return to the clutch engaging position.

In the drawings in which several embodiments of a fishing reel according to the invention are shown:

Figs. 5–7 are elevations showing a modified embodiment of the mechanism shown in Figs. 1–4.

Fig. 8 is a detail view showing a modification.

Fig. 9 is a section on line 9—9 of Fig. 8. Fig. 10 shows a modified embodiment of a resilient locking arm and Fig. 11 is a section on line 11—11 of Fig. 10.

Figure 1:
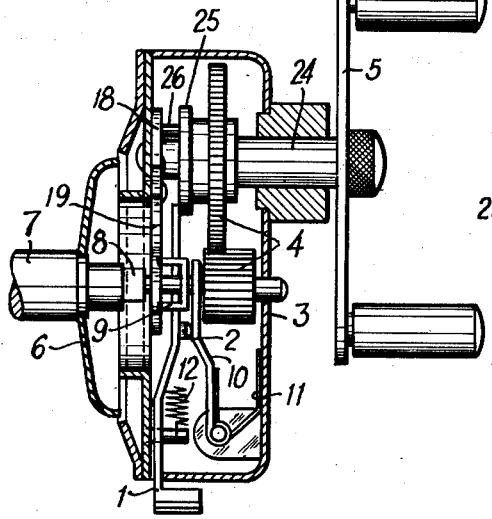
Fig. 1 is a sectional elevation of part of a fishing reel comprising the improved mechanism.

The mechanism according to the invention comprises a forked disconnecting lever 1 provided with a knob 2 and bent according to Fig. 1. The lever 1 is radially movable in the casing 3 for a driving mechanism comprising a gear 4 between a handle 5 and the shaft 7 of the spool 6 of the reel so that a claw coupling 8, 9 on the shaft 7 on the shaft 7 on depression of the lever 1 in known manner is released by an arm 10 being displaced by the knob 2 in the direction of the shaft 7 and carrying along the coupling element 9 out of engagement with the coupling element 8. The arm 10 is urged towards the left in Fig. 1 by a spring 11. When the lever 1 moves outwards the coupling 8, 9 is re-engaged by the action of the spring 11.

The impression of the lever 1 is effected manually and said lever is locked in releasing position and returns automatically to the engagement position on turning of the handle 5 by means of the mechanism described hereinbelow.

The lever 1 tends to occupy the clutch engagement position by being actuated by the action of a spring 12 which at one end is secured to a pin 14 fastened at the side wall 13 of the casing 3 and at the other end at a pin 15 on the lever 1 having two studs 16 and 17 which in releasing position prevent the lever 1 from moving outwards by the studs 17 and 16 in this position being locked by two locking arms 18 and 19, respectively. These locking arms are journaled on studs 20 and 21, respectively, on the side wall 13 and are actuated by springs 22 and 23, respectively, so that they tend to occupy positions in which the studs 16 and 17 are prevented from moving outwards.

On the driving shaft 24 of the handle 5 of the reel is provided a disc 25 having a stud 26 extending in axial direction and rotatable together with the handle 5. A cam 36 and 37 respectively on each one of the double-armed locking arms 18, 19 is adapted to cooperate with the stud 26 in such a manner that when the stud 26 is brought into contact with any one of the cams 36 and 37 the corresponding arm 18 and 19 will be turned and releases the stud 16 or 17 so that the lever 1 may return to the engaging position.

Figure 2:
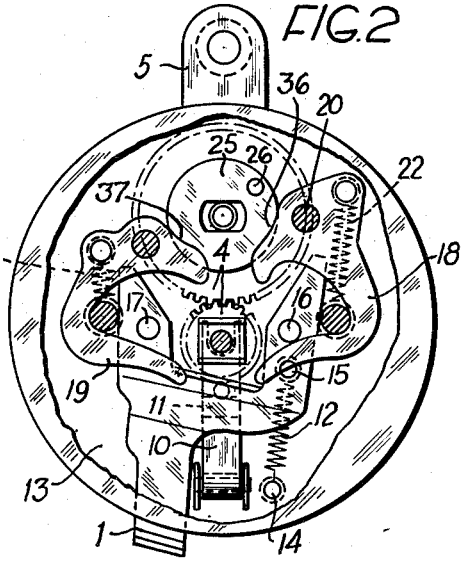
Fig. 2 is an elevation, part of the casing being broken away to show the interior, of the reel shown in Fig. 1 as seen in the direction of the arrow.
Figure 3:
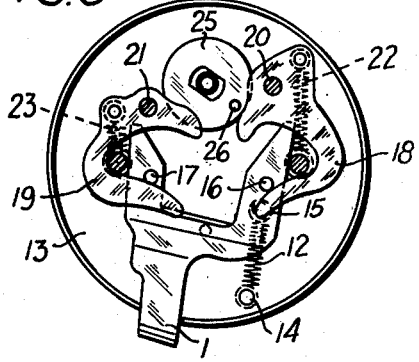
Figs. 3 and 4 are elevations of the reel shown in Figs. 1 and 2 but simplified and on a smaller scale and showing parts of the interior mechanism in different positions.
Figure 4:
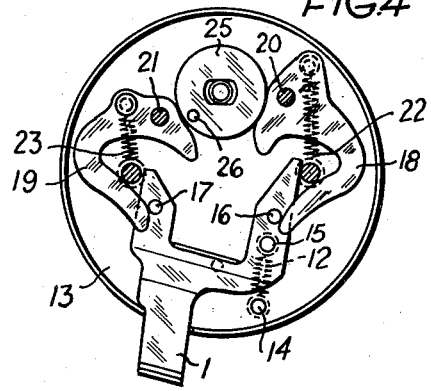

Figs. 2–4 show various positions of the lever 1 and the cooperation between the stud 26 and the locking arms 18 and 19, respectively. In Fig. 2 the lever 1 is depressed so that the spool 6 can rotate freely independently of the handle 5. The locking arms 18 and 19 catch the studs 16 and 17 by the springs 22 and 23, respectively, retaining the locking arms 18 and 19 in the position as shown. The studs 16 and 17 are arranged on somewhat different levels or the locking arms 18 and 19 are so shaped that when the lever 1 is impressed only one of the locking arms, for instance the arm 18, retains the lever 1 while the other locking arm 19 is spaced from the stud 17.

When the lever 1 occupies the position shown in Fig. 2 and the handle 5 together with the disc 25 with the stud 26 is turned, said stud will contact the cam 36 of the locking arm 18 and swing the same into the position shown in Fig. 3. During this operation the lever 1 is pulled downwardly by the spring 12 until the stud 17 contacts the cam 37 of the arm 19 which retains the lever 1 in an intermediate position. The shape of the locking arm 18 is such that the locking arm 18 cannot return to the locking position from the position shown in Fig. 3 when the stud 26 is turned further into the position shown in Fig. 4, but the lever 1 can still move freely independent of the locking arm 18 so that when the locking arm 19 is swung by the stud 26 into the position shown in Fig. 4, the arm 1 is completely released and returns to the engaging position and the spool 6 and the handle 5 are connected by means of the claw coupling 8, 9.

When the spool 6 is released any one of the locking arms can swing freely independently of the position of the stud 26 and the handle 5 so that when the lever 1 is depressed either the locking arm 18 or 19 or both can occupy the locking position.

Figure 5:
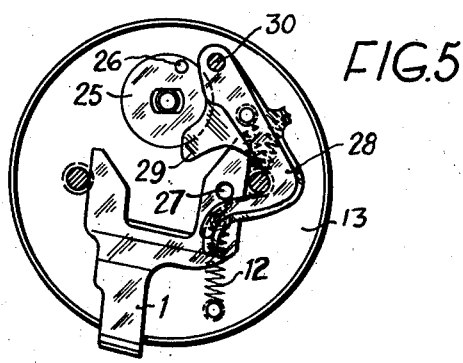

Both of the locking arms can, according to a modification of the invention, be journaled on a common stud 30, as shown in Figs. 5–7, in which case only one stud 27 is required on the lever 1. In this construction the cams of the locking arms 28, 29 are so arranged that at first the locking arm 28 is swung into the position shown in Fig. 6 and the lever 1 will rest on the locking arm 29, whereupon the locking arm 29 on further rotation of the disc 25 is swung into the position shown in Fig. 7 and the lever 1 will be released and occupy the engaging position, as above described.

In a further embodiment of the invention one (31) of the studs on the lever 1, may be resiliently slidable according to Figs. 8 and 9. The stud 31 is movable in a slot in the lever 1 and is actuated by a spring 32 which at one end abuts against a holder 33 rigidly secured to the lever 1. The other structural features of the device resemble those shown in Figs. 2–4. By means of the resilient stud 31 the intermediate position of the lever 1, as shown in Fig. 3, is dispensed with. In the locking position shown in Fig. 2 the locking arm 18 keeps the spring 32 compressed by the stud 31 resting on the locking arm while the stud 17 abuts against the locking arm 19. When the locking arm 18 is swung, as shown in Fig. 3, the lever 1 will not move downwards but the stud 31 is actuated by the spring 32 so that said stud occupies the position shown in Fig. 8, whereby the device operates in the same manner as above described.

Instead of making the stud 31 resilient, the locking arm 18 may be resiliently journaled, as shown in Figs. 10–11. The stud 20 extends through an elongated slot 34 in the locking arm and the stud 20 is kept pressed against the lower end of the slot by means of a spring 35 secured to the locking arm 18. The device operates in the same manner as the resilient stud 31 but in this case it is the locking arm that is pulled upwards by the spring 35 instead of the stud on actuation of the stud 26 against the locking arm 18.

In all of the described embodiments the lever 1 will be always locked by any one of the locking arms independent of the position of the stud 26 and thus the handle 5 so that the spool in all positions of the handle can be released from the handle.

What I claim is:

1. In a fishing reel, a gear casing, a rotatable spool journaled at one end in said casing, a driving shaft for the spool journaled in the casing, a clutch between the spool and the driving shaft, means normally urging said clutch to spool-driving position, lever means operable by the operator and movable to one position to effect release of the clutch and to another position to effect engagement of the clutch, two locking arms swingably mounted in the casing and each adapted independently of the other in one position to retain said lever means in the non-engaging position and in another position to release said lever means, and means on the driving shaft for cooperation with said locking arms one at a time and adapted when said lever means is in the clutch releasing position to release said locking arms for enabling said lever means to return to the clutch engaging position.

2. In a fishing reel, a gear casing, a rotatable spool journaled at one end in said casing, a driving shaft for the spool journaled in the casing, a clutch between the spool and the driving shaft, means normally urging said clutch to spool-driving position, lever means operable by the operator and movable to one position to effect release of the clutch and to another position to effect engagement of the clutch, resilient means urging said lever means to clutch engaging position, two locking arms swingably mounted in the casing on opposite sides of the driving shaft and each adapted independently of the other in one position to retain said lever means in the non-engaging position and in another position to release said lever means, resilient means urging locking arms to locking position and means on the driving shaft for cooperation with said locking arms one at a time and adapted when said lever means is in the clutch releasing position to release said locking arms for enabling said lever means to return to the clutch engaging position.

3. In a fishing reel, a gear casing, a rotatable spool journaled at one end in said casing, a driving shaft for the spool journaled in the casing, a clutch between the spool and the driving shaft, means normally urging said clutch to spool-driving position, lever means operable by the operator and movable to one position to effect release of the clutch and to another position to effect engagement of the clutch, resilient means urging said lever means to clutch engaging position, two locking arms swingably mounted in the casing on a common stud and each adapted independently of the other in one position to retain said lever means in the non-engaging position and in another position to release said lever means, resilient means urging said locking arms to locking position and means on the driving shaft for cooperation with said locking arms one at a time and adapted when said lever means is in the clutch releasing position to release said locking arms for enabling said lever means to return to the clutch engaging position.

4. In a fishing reel, a gear casing, a rotatable spool journaled at one end in said casing, a driving shaft for the spool journaled in the casing, a clutch between the spool and the driving shaft, means normally urging said clutch to spool-driving position, a forked lever operable by the operator and movable to one position to effect release of the clutch and to another position to effect engagement of the clutch, a stud on each of the forked legs, resilient means urging said lever to clutch engaging position, two locking arms swingably mounted in the casing and each adapted independently of the other in one position to retain said lever in the non-engaging position and in another position to release said lever, resilient means urging said locking arms to locking position, a projection on the driving shaft, a cam on each locking arm for cooperation with said projection, a cam on each locking arm for cooperation with one of the studs on the forked lever, said last-mentioned cams on the locking arms and the studs on the lever being so shaped and arranged in relation to each other as to cause one cam to release said lever before the other.

5. In a fishing reel, a gear casing, a rotatable spool journaled at one end in said casing, a driving shaft for the spool journaled in the casing, a clutch between the spool and the driving shaft, means normally urging said clutch to spool-driving position, a lever operable by the operator and movable to one position to effect release of the clutch and to another position to effect engagement of the clutch, a stud on the lever, resilient means urging said lever to clutch engaging position, two locking arms mounted in the casing for swingable movement about the same axis on a common stud and each adapted independently of the other in one position to retain said lever in the non-engaging position and in another position to release said lever, resilient means urging said locking arms to locking position, a projection on the driving shaft, a cam on each locking arm for cooperation with said projection, a cam on each locking arm for cooperation with the stud on the lever, said last-mentioned cams on the locking arms being so shaped and arranged in relation to each other as to cause one cam to release said lever before the other.

6. A fishing reel as claimed in claim 4, in which one of the studs on the forked lever is resiliently and slidably mounted in the lever so as to allow the appertaining locking arm to move from the retaining position to the releasing position without movement of the lever.

7. A fishing reel as claimed in claim 4, in which one of the locking arms is resiliently and slidably mounted on its stud so as to permit movement thereof from the retaining position to the releasing position without movement of the lever.

ÅKE EUGEN MURVALL.

No references cited.